United States Patent [19]
Kraemer et al.

[11] Patent Number: 5,559,694
[45] Date of Patent: Sep. 24, 1996

[54] DEVICE FOR REDUCING TORQUE WHEN SHIFTING A TRANSMISSION

[75] Inventors: Gerd Kraemer, Baierbrunn; Lothar Wolf, Munich, both of Germany

[73] Assignee: Bayerische Motoren Werke AG, Munich, Germany

[21] Appl. No.: 287,687

[22] Filed: Aug. 19, 1994

[30] Foreign Application Priority Data

Aug. 19, 1993 [DE] Germany ................... 43 27 906.6

[51] Int. Cl.$^6$ ..................... B60K 41/22; F02D 29/00
[52] U.S. Cl. ..................... 364/424.1; 364/431.03; 477/43; 477/107; 477/109
[58] Field of Search ................. 364/424.1, 431.01, 364/431.04, 431.07; 477/34, 43, 39, 63, 101, 107, 109, 111, 73, 101

[56] References Cited

U.S. PATENT DOCUMENTS

| | | | |
|---|---|---|---|
| 3,548,685 | 12/1970 | Dittrich. | |
| 4,266,447 | 5/1981 | Heess et al. | 477/101 |
| 4,336,778 | 6/1982 | Howard | 123/334 |
| 4,355,550 | 10/1982 | Will et al. | 477/102 |
| 4,370,904 | 2/1983 | Muller et al. | 477/109 |
| 4,403,527 | 9/1983 | Mohl et al. | 477/32 |
| 5,119,696 | 6/1992 | Yamaguchi | 477/109 |
| 5,407,401 | 4/1995 | Bullmer et al. | 477/110 |
| 5,417,625 | 5/1995 | Yamaki et al. | 477/109 |

FOREIGN PATENT DOCUMENTS

| | | |
|---|---|---|
| 2848624 | 5/1980 | Germany. |
| 3018033 | 11/1981 | Germany. |
| 3420126A1 | 12/1985 | Germany. |
| 3830938A1 | 4/1990 | Germany. |
| 3830938C2 | 11/1992 | Germany. |
| 4221044A1 | 6/1993 | Germany. |
| 4204401A1 | 8/1993 | Germany. |
| 1-257729 | 10/1989 | Japan. |

Primary Examiner—Kevin J. Teska
Assistant Examiner—Tan Nguyen
Attorney, Agent, or Firm—Evenson, McKeown, Edwards & Lenahan, P.L.L.C.

[57] ABSTRACT

In a device for reducing engine torque between the beginning and end of a shift of a transmission in motor vehicles with a control device that detects the beginning of a shift as well as continuously determines the current engine rpm, and calculates in advance the engine rpm anticipated at the end of the shift, the amount of reduction of engine torque between the beginning and end of the shift is regulated in such a manner that a preset engine rpm curve is achieved.

7 Claims, 2 Drawing Sheets

DEVICE FOR REDUCING TORQUE WHEN SHIFTING A TRANSMISSION

BACKGROUND AND SUMMARY OF THE INVENTION

The invention relates to a device for reducing engine torque when shifting a transmission in motor vehicles and, more particularly, to a device for reducing engine torque between the beginning and end of a shift of a transmission in motor vehicles having a control device that continuously detects a beginning of a shift as well as a current engine rpm and calculates in advance an engine rpm anticipated at an end of the shift.

A device of the above-mentioned type is known, for example, from German Patent document DE 28 48 624 C2. In this known device for reducing engine torque, the current engine rpm is detected at the beginning of a shift. The beginning of a shift is recognizable, for example, by a shift command issued by a transmission control device and/or by a change in engine rpm that is characteristic of the beginning of a shift (see for example German Patent document DE 30 18 033 A1). Additionally, in the device known from German Patent document DE 28 48 624 A1, the anticipated engine rpm at the end of the shift, the so-called "synchronous rpm", is calculated in advance. The synchronous rpm can be determined, for example, from the engine rpm detected at the beginning of the shift and from the sudden gear change which forms the basis of this shift. Reduction of engine torque during the shift or between the beginning and end of a shift begins at an initial rpm value and ends at a final rpm value. The beginning and ending rpm values are between the engine torque values detected at the beginning of the shift and the engine torque expected at the end of the shift or calculated in advance, and are also determined as a function of the difference between these engine rpms. The amount of reduction of the engine torque is determined as a function of the value of the engine rpm detected at the beginning of the shift.

In this known device, the engine rpm curve between the engine rpms at the beginning and end of the shift is not taken into account. Since the reduction of engine torque is controlled only by a preset value without taking this engine rpm curve into account, variations in the resultant engine rpm curve from an optimum engine rpm curve are possible, for example, because of mechanical tolerances or because of the temperature dependence of the hydraulic system. Optimum shifting quality or shifting time cannot be guaranteed because of these variations, so that increased wear or adverse effects on comfort occur.

There is therefore needed a device which optimizes the shifting quality and/or the shifting times during a shift with regard to mechanical wear and with regard to temperature requirements.

These needs are met according to the present invention by providing a device for reducing engine torque between the beginning and end of a shift of a transmission in motor vehicles having a control device that continuously detects a beginning of a shift as well as a current engine rpm and calculates in advance an engine rpm anticipated at an end of the shift. The amount of reduction of an engine torque ($M_{M2}$) is regulated between the beginning ($t_0$) and end ($t_2$) of the shift in such a manner that a predetermined engine rpm curve ($v_2$) is achieved.

According to the present invention, the amount of reduction of engine torque between the beginning and end of the shift is regulated in such a manner that a preset engine rpm curve is reached. For this purpose, for example, optimum engine torque curves for all possible gear changes are stored in the form of characteristic diagrams from which, depending on the current gear change during a shift, an engine rpm curve is selected and set. The stored engine rpm curves can, for example, contain a dependence upon the difference between the engine rpms present at the beginning and end of the shift or a dependence on the temperature of the hydraulic fluid in the transmission. The preset engine rpm curve can, for example, be in the form of a change in rpm per unit time or in the form of a ratio, for example, a ratio of the difference between the current rpm and the rpm at the end of the shift, to the difference between the rpm present at the beginning and end of the shift.

Reduction of engine torque can be performed in different ways, depending on the value of the amount required to reach the preset engine rpm curve. Preferably, the ignition timing angle is retarded for rapid reduction. It is also possible however, especially with high values for reduction, to reduce the volume of fuel injected and/or the throttle valve opening angle. As a result of the regulation of the reduction of the engine torque according to the present invention, corresponding to an optimum engine rpm curve, clutch wear is reduced and shifting comfort is increased in contrast to the known controls for reducing engine torque.

An advantageous embodiment of the present invention preferably forms the set engine rpm curve from a standard engine rpm curve as a function of the difference between the engine rpm detected at the beginning of the shift and the engine rpm anticipated after the shift.

For example, it is possible to specify only one engine rpm curve for all upshifts and all downshifts, which is changed as a function of the stated difference in engine rpm. For example, the engine rpm curve can be modified in such fashion that when there are large differences, the shifting time is extended and when the differences are small, the shifting time is reduced. With this improvement, according to the invention, by storing only one (or a few) curve or curves instead of plurality of curves, storage space in the control device can be saved.

According to the present invention, the torque of the clutch to be shifted is additionally increased during the shift when the amount of required reduction of engine torque is greater than a maximum possible or maximum admissible amount.

For example, if the motor torque is reduced only by retarding the ignition timing angle, the amount of reduction is limited to a maximum admissible retardation of the ignition timing angle. Therefore, if intervention in the operating parameters of the engine is not sufficient to achieve the desired reduction of the engine torque, the torque in the clutch to be shifted is increased in such a manner that the set engine rpm curve is nevertheless maintained.

The torque in the clutch to be shifted is normally adjusted by pressure control during the shift. According to the invention, for example, the torque in the clutch to be shifted is increased by an offset pressure which is added to the normally set pressure curve.

Other objects, advantages and novel features of the present invention will become apparent from the following detailed description of the invention when considered in conjunction with the accompanying drawings.

DETAILED DESCRIPTION OF THE DRAWINGS

Figure 1:
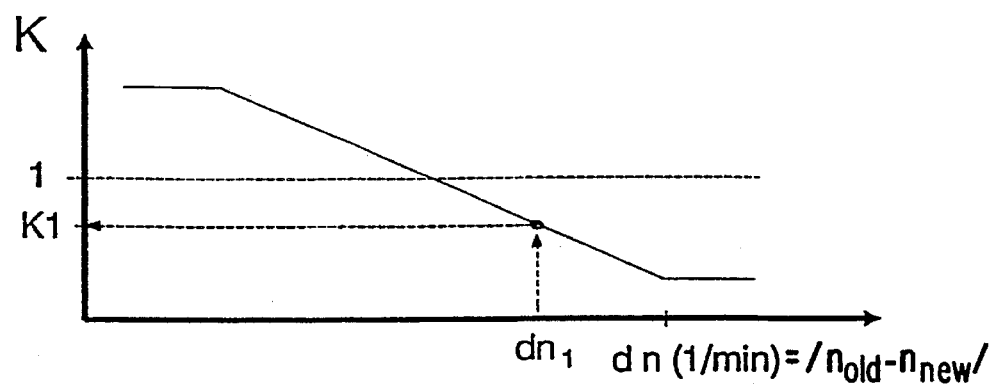
FIG. 1 is a graphical representation showing the determination of a factor as a function of the difference between the engine rpm at the beginning and end of a shift.

In the following, the engine rpm "n" will be indicated exclusively by rpm n and the engine torque $M_M$ will be designated exclusively by motor torque $M_M$. In the diagram in FIG. 1, the rpm difference dn between the rpms at the beginning $n_{old}$ and end $n_{new}$ of a shift is plotted on the abscissa and a factor K is plotted on the ordinate. Rpm $n_{old}$ at the beginning of a shift is measured and rpm $n_{new}$ at the end of a shift is calculated in advance for example. The diagram in FIG. 1 shows one possible curve by which an individual factor K is assigned to each possible rpm difference dn between the beginning and end of a shift. For example, a first factor K1 is associated with a first difference $dn_1$. The factor K determined by the diagram in FIG. 1 for each shift is used to determine the set rpm curve or rpm ratio curve, shown in FIG. 2A. Factor K decreases with increasing difference dn.

Figure 2A:
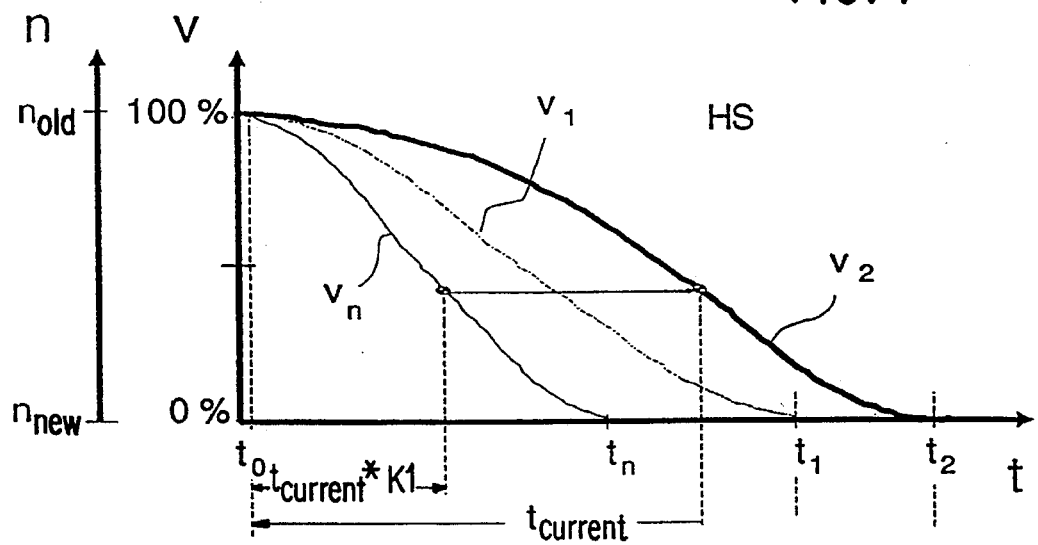
FIG. 2A is a graphical representation showing a standard engine rpm curve, an rpm curve according to the prior art, and an engine rpm curve set according to the invention, in the form of rpm ratio curves.

FIG. 2A shows different rpm curves n, especially in the form of rpm ratio curves v, for an upshift HS. Time t is plotted on the abscissa in FIG. 2A and the rpm n between $n_{old}$ and $n_{new}$ is plotted on the ordinate. The standardized rpm ratio v between 0% and 100% is shown, with the rpm $n_{new}$ after the shift being assigned the 0% value while the rpm $n_{old}$ before the shift is assigned the 100% value. The rpm ratio curve $v_n$, plotted with a thin continuous line, represents a stored standardized rpm curve or rpm ratio curve which is equal to the set rpm ratio curve for the factor K=1.

The set rpm curve in the form of the rpm ratio curve $v_2$ is formed from the standardized rpm ratio curve $v_n$ in such a manner that during the shift, this time $t_{current}$ is multiplied continuously by the factor K, with K1 less than 1 in this case. For example, at each sampling instant, the time $t_{current}$ elapsed since the beginning of the shift at instant $t_0$ is determined, and the rpm ratio v assigned to instant $t_{current}$ *K1 is selected from the stored standardized rpm ratio curve $v_n$ and set at instant $t_{current}$. This procedure is repeated until the shift is ended at instant $t_2$. With a factor K1 less than 1, the set shifting time $t_2-t_0$ is longer than the standardized shifting time $t_n-t_0$.

Figure 2B:
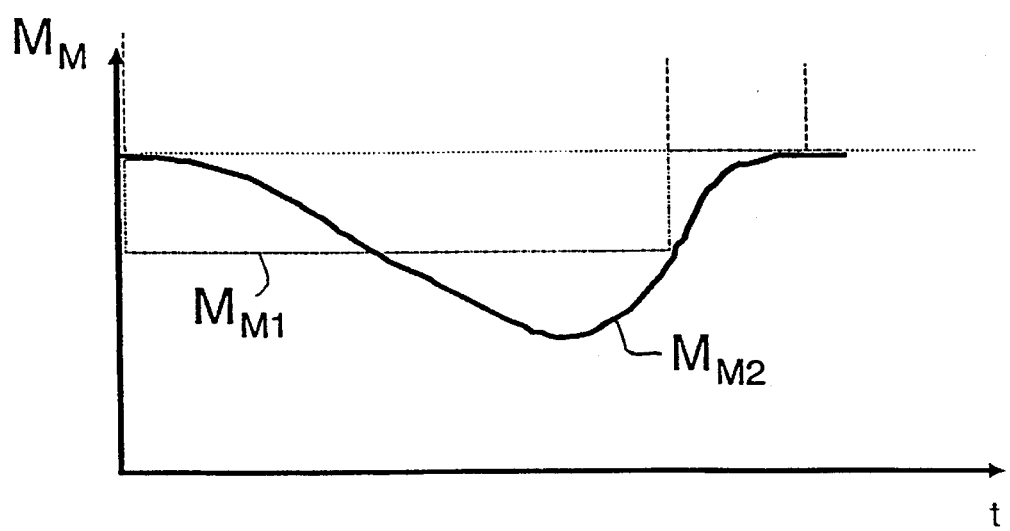
FIG. 2B is a graphical representation showing a reduction of engine torque according to the prior art and a reduction of engine torque according to the invention.

In FIG. 2B, the heavy solid line represents the motor torque $M_{M2}$ which is regulated in such a manner that the set rpm ratio curve $v_2$ is reached. Regulation of motor torque $M_{M2}$ begins with an rpm $n_{old}$, the synchronous rpm before the shift, at instant $t_0$, which marks the beginning of a shift, and ends after shifting time $t_2-t_0$ at an rpm $n_{new}$, the synchronous rpm at the end of the shift.

The dot-dashed lines in FIGS. 2A and 2B show, in comparison to the heavy solid lines according to the present invention, the reduction of engine torque according to the prior art. In the prior art, at the beginning of the shift at instant $t_0$, motor torque $M_{M1}$ is reduced by a certain amount, which is maintained until the new synchronous rpm is reached after a random shifting time $t_1$ and with a random rpm (ratio) curve $v_1$. As a result, variations in the resultant rpm ratio curve $v_1$ from the optimum rpm ratio curve $v_2$ are possible, as shown for example in FIG. 2A.

By regulating the amount of reduction of motor torque $M_M$ corresponding to a preset optimum rpm curve (v, n), optimum shifting comfort and minimum wear may be achieved.

In FIG. 2B, with the curve of motor torque of $M_{M2}$, a set point characteristic of motor torque $M_M$ is shown, which is necessary in order to reach the preset rpm ratio curve $v_2$. If the amount of the set motor torque $M_{M2}$ to be reduced in this case cannot be achieved by influencing the operating parameters of the engine, in addition, but not shown here, the torque of the clutch to be shifted can be increased in order to achieve the preset rpm ratio curve $v_2$ in any case.

Figure 3:
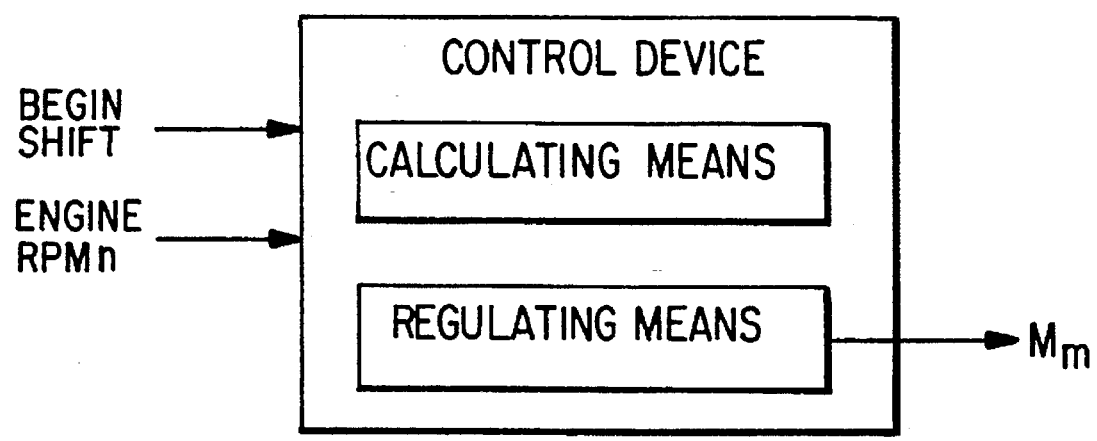
FIG. 3 is a schematic block diagram of the control device according to the invention.

FIG. 3 shows schematically the control device having a calculating device and a regulating device.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for reducing engine torque between the beginning and end of a shift of a transmission in motor vehicles, comprising:

a control device that continuously detects a beginning of a shift and a current engine rpm, said control device including means for calculating in advance an engine rpm anticipated at an end of the shift, and means for regulating an amount of reduction of an engine torque ($M_{M2}$) between the beginning ($t_o$) and end ($t_2$) of the shift in such a manner that a predetermined engine rpm curve ($v_2$) is achieved.

2. A device according to claim 1, wherein said predetermined engine rpm curve ($v_2$) is formed from a standardized engine rpm curve ($v_n$) as a function of a difference (dn) between an engine rpm ($n_{old}$) detected at the beginning ($t_o$) of the shift and an anticipated engine rpm ($n_{new}$) anticipated after the shift ($t_2$).

3. A device according to claim 2, wherein a torque of the clutch to be shifted is additionally increased during this shift, when an amount of reduction in engine torque ($M_{M2}$) required to reach the predetermined engine rpm curve ($v_2$) is greater than one of a maximum possible and maximum permissible amount.

4. A device according to claim 1, wherein a torque of the clutch to be shifted is additionally increased during this shift, when an amount of reduction in engine torque ($M_{M2}$) required to reach the predetermined engine rpm curve ($v_2$) is greater than one of a maximum possible and maximum permissible amount.

5. A method for reducing engine torque between the beginning and end of a shift of a transmission in motor vehicles, the method comprising the steps of:

continuously detecting a beginning of a shift and a current engine rpm in a control device;

calculating in advance an engine rpm anticipated at an end of the shift in said control device; and regulating an amount of reduction of an engine torque ($M_{M2}$) between the beginning ($t_0$) and end ($t_2$) of the shift in such a manner that a predetermined engine rpm curve ($v_2$) is achieved.

6. A method according to claim 5, further comprising the step of forming the predetermined engine rpm curve ($v_2$) from a standardized engine rpm curve ($v_n$) as a function of a difference (dn) between an engine rpm ($n_{old}$) detected at the beginning ($t_0$) of the shift and an anticipated engine rpm ($n_{new}$) anticipated after the shift ($t_2$).

7. A method according to claim 6, further comprising the step of additionally increasing a torque of the clutch to be shifted during this shift, when an amount of reduction in engine torque ($M_{M2}$) required to reach the predetermined engine rpm curve ($v_2$) is greater than one of a maximum possible and maximum permissible amount.

* * * * *